The present application is a continuation-in-part of our co-pending application Serial No. 56,713, now abandoned, filed September 19, 1960, entitled "Gas Chromatograph Sampling Valve."

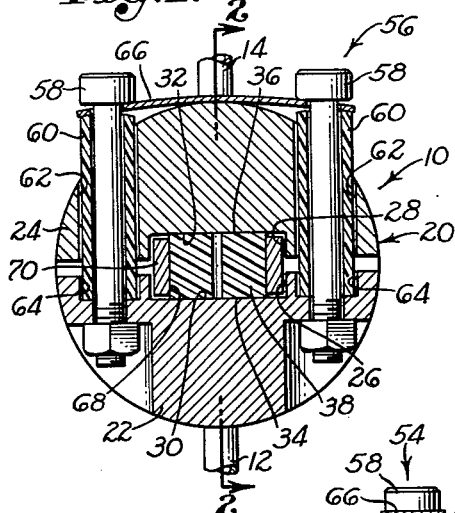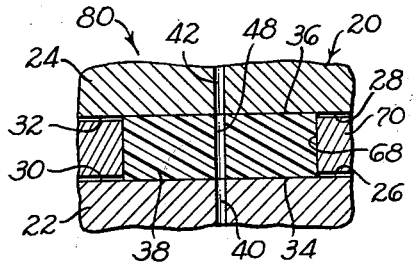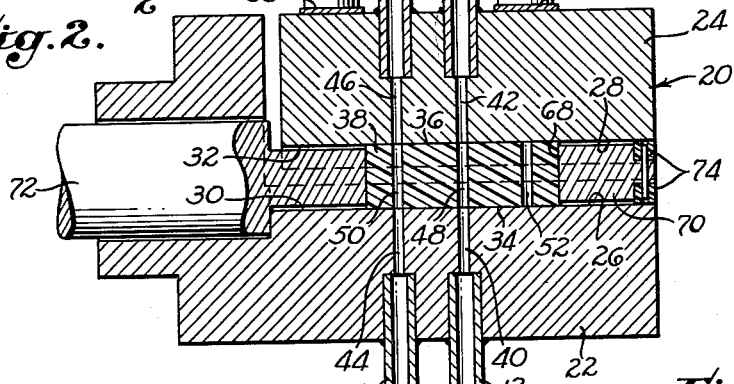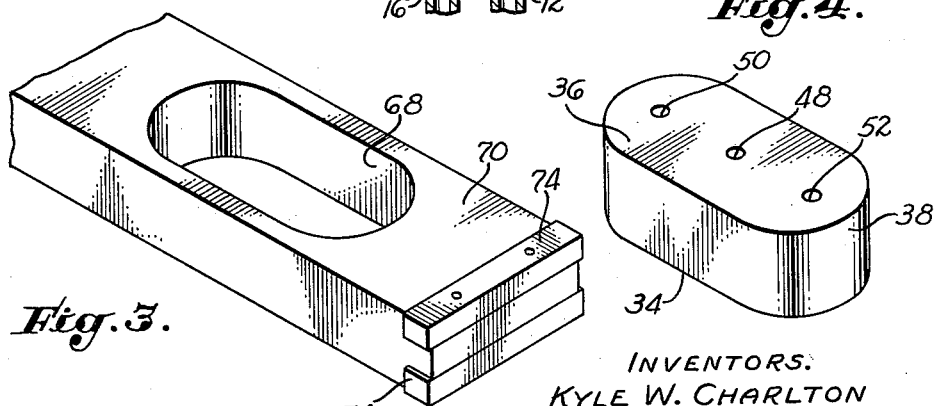
INVENTORS.
KYLE W. CHARLTON
STANFORD B. SPRACKLEN
CHARLES T. MAXWELL
BY THEIR ATTORNEYS.
HARRIS, KIECH, RUSSELL & KERN 3,160,015
GAS CHROMATOGRAPH SAMPLING VALVE
Kyle W. Charlton, La Mirada, Charles T. Maxwell, Anaheim, and Stanford B. Spracklen, Fullerton, Calif., assignors to Beckman Instruments, Inc., a corporation of California
Filed June 22, 1961, Ser. No. 120,886
4 Claims. (Cl. 73—422)

The present invention relates in general to gas chromatography and, more particularly, to a sampling valve which is especially useful for injecting accurately metered samples into gas chromatography apparatus, although it may be utilized for other purposes also.

In general, the invention contemplates a sampling valve comprising a housing having two passages therein and including two spaced track surfaces, a valve element disposed between and having surfaces in sealing engagement with the track surfaces and provided with a passage therein which interconnects the passages in the housing in one position of the valve element, and means maintaining the track surfaces on the housing in sealing engagement with the corresponding surfaces of the valve element.

An important object of the invention is to provide a sampling valve of the foregoing nature utilizing a nonmetallic valve element which is self lubricating and which also possesses the characteristic of exhibiting only limited flow under stress. With this construction no lubrication of the valve element is necessary and the valve element, under clamping stresses, will deform only a sufficient amount to provide a tight seal with the tracks. Such characteristics are exhibited by reinforced polytetrafluoroethylene and by reinforced fluorinated ethylenepropylene polymers. These materials are known commercially as Teflon TFE fluorocarbon resin and Teflon FEP fluorocarbon resin. The mechanical properties of these resins are modified by compounding with certain filling materials such as metallic copper and bronzes, glass fiber, ceramic fibers, graphite, coke flour, molybdenum disulfide, clay, talc, silica, asbestos, and calcium fluoride.

Another object of the invention is to provide a sampling valve wherein the valve element is merely a button-like element mounted in an opening in a carrier which is disposed between, but spaced from, the track surfaces on the housing.

A further object of the invention is to provide a sampling valve wherein one of the track surfaces on the housing is movable relative to the other track surface to a limited extent in the direction of movement of the valve element between its operating positions. This construction has the effect of dividing the starting friction of the valve element into two parts, each equal to substantially one-half of the total, which is an important feature since it permits the use of a smaller actuator for the valve element, thereby reducing the over-all size and weight of the sampling valve.

The foregoing objects, advantages, features and results of the present invention, together with various other objects, advantages, features and results thereof which will be evident to those skilled in the sampling valve art in the light of this disclosure, may be achieved with the exemplary embodiments of the invention described in detail hereinafter and illustrated in the accompanying drawing, in which:

FIG. 1 is a transverse sectional view of a sampling valve which embodies the invention;

FIG. 2 is a longitudinal sectional view of the sampling valve taken along the arrowed line 2—2 of FIG. 1;

FIGS. 3 and 4 are enlarged isometric views of components of the sampling valve of the invention; and FIG. 5 is a fragmentary longitudinal sectional view similar to a portion of FIG. 2, but illustrating another embodiment of the invention.

Referring first to FIGS. 1 to 4 of the drawing, illustrated therein is a sampling valve 10 for injecting an accurately measured slug of a sample stream flowing through lines 12 and 14 into a carrier or eluting stream flowing through lines 16 and 18. The carrier stream, which may be helium, for example, then transports the sample slug to the gas chromatography apparatus, as is well known in the art.

It might be pointed out that the sampling valve 10 is greatly enlarged in the drawing for clarity of illustration. In actual practice, the size of the valve may be half that shown in the drawing, or less.

The sampling valve 10 includes a housing 20 which is divided into main and auxiliary housing parts 22 and 24 having therein opposed channel-shaped tracks 26 and 28 which provide spaced, parallel, metallic track surfaces 30 and 32. Disposed between and having surfaces 34 and 36 complementary to and in sealing engagement with the track surfaces 30 and 32, respectively, is a slidable valve element 38.

The main and auxiliary housing parts 22 and 24 are provided therein with aligned passages 40 and 42 respectively communicating with the lines 12 and 14, and are also provided therein with aligned passages 44 and 46 respectively communicating with the lines 16 and 18. The passages 40 and 44 extend through the track surface 30 and the passages 42 and 46 extend through the track surface 32.

The valve element 38 is provided therethrough with a passage 48 which, in one position of the valve element, interconnects the passages 40 and 42, as shown in FIG. 2 of the drawing. In another position of the valve element 38, the passage 48 interconnects the passages 44 and 46. The valve element 38 is also provided therethrough with a passage 50 which interconnects the passages 44 and 46 in the first position of the valve element, but which is out of communication with all of the passages 40, 42, 44 and 46 in the second position of the valve element. Finally, the valve element 38 is provided therethrough with a passage 52 which is out of communication with all of the passages 40, 42, 44 and 46 in the first position of the valve element, but which interconnects the passages 40 and 42 in the second position of the valve element.

Thus, when the valve element 38 is in its first position, as shown in FIG. 2 of the drawing, the sample and carrier streams respectively flow through the passages 48 and 50 in the valve element. However, when the valve element 38 is in its second position, the sample and carrier streams respectively flow through the passages 52 and 48 in the valve element, the passage 52 thus preventing any pressure build up in the sample stream. If the valve element 38 is moved from its first position to its second position suddenly, a slug of the sample fluid is trapped in the passage 48 and is injected virtually intact into the carrier stream for delivery to the gas chromatography apparatus, the volume of such sample slug depending on the length and diameter selected for the passage 48. The valve element 38 is then returned to its first position preparatory to a subsequent injection of another slug of the sample fluid into the carrier stream.

The surfaces 34 and 36 of the valve element 38 are sealed in a fluid tight manner with respect to the track surfaces 30 and 32 by clamping the valve element between the housing parts 22 and 24, with the result that the valve element is loaded in compression. This is accomplished in the construction illustrated by pairs 54 and 56 of bolts 58 which extend through the housing parts 22 and 24, the bolts of each pair being disposed on opposite sides of the path of the valve element 38. The bolts 58 extend through spacers 60, preferably formed of a material such as polytetrafluoroethylene, which extend through openings 62 through the housing part 24 into recesses 64 in the housing part 22. The bolts 58 of each of the pairs 54 and 56 extend through the ends of a leaf spring 66 which is seated intermediate its ends against the housing part 24. The ends of each leaf spring 66 engage the heads of the corresponding bolts 58 and the adjacent ends of the corresponding spacers 60. Thus, each leaf spring 66 equalizes the clamping forces applied to the valve element 38 by the corresponding bolts 58.

As exaggeratedly shown in FIG. 1 of the drawing, there are slight clearances between the spacers 60 and the walls of the openings 62 and the recesses 64, and between the bolts 58 and the spacers 60, such clearances being the result of providing simple sliding fits, as opposed to press fits. The result is that the auxiliary housing part 24 is somewhat loosely connected to the main housing part 22 so that the auxiliary housing part can move relative to the main housing part, in the direction of movement of the valve element 38, to a slight extent. Consequently, starting friction between the valve element 38 and the track surfaces 30 and 32 is split into two parts, each substantially equal to one-half of the total. This reduces the force necessary to start movement of the valve element 38 out of either of its positions toward the other, and thus permits a smaller actuator, not shown.

An important feature of the invention is that the valve element 38 is made of a self-lubricating material which also has the characteristic of exhibiting only limited flow under clamping stresses. Consequently a self-lubricating material can be utilized for the valve element 38 without a significant flow thereof at the clamping pressure employed. However, a limited amount of flow is a desirable feature as it brings about a fluid-tight sealing engagement between the valve-element surfaces 34 and 36 and the tracflk surfaces 30 and 32.

Preferably, the valve element 38 consists primarily of a material such as polytetrafluoroethylene or fluorinated ethylene-propylene polymers. These materials are designated commercially as Teflon TFE fluorocarbon resins and Teflon FEP fluorocarbon resins. These materials as is well known, slide on metallic surfaces with very little friction. However, the pure resins will almost always exhibit flow characteristics at any stress greater than zero. To render the valve element 38 suitable for the application it is an important feature of the invention to modify the physical characteristics of the pure resin by the addition of certain filling materials. Various additives may be used for this purpose. For example, adding 25% by weight of powdered glass to the polytetrafluoroethylene produces optimum conditions of low friction, easy machinability, low brittleness, and the like. Alternatively, adding approximately 15% by weight of calcium fluoride to the polytetrafluoroethylene provides satisfactory results. Various other additives, such as metal salts and powdered metals, may be used. However, any additive which is used must have a melting temperature higher than the molding temperature of the polytetrafluoroethylene, and must be inert with respect to the sample and carrier streams. Also, the quantity of additive should not exceed about 35% by weight, and should be at least 10% to 15% by weight.

The valve element 38 is merely a button-like element which is set in an opening 68 in a carrier 70 disposed between, but spaced from, the track surfaces 30 and 32 so that only the valve element itself engages the track surfaces, the carrier preferably being metallic. The carrier 70 has a portion 72 which projects axially from one end of the housing 20 and to which any suitable actuator, not shown, for shifting the valve element 38 between its operating positions may be connected. Such actuator may, for example, be pneumatic, hydraulic, electrical, mechanical, or the like. It will be noted that the carrier 70 is guided by the portion 72 thereof and by the valve element 38. To eliminate any possibility of contact between the free end of the carrier 70 and the track surfaces 30 and 32, such free end has mounted thereon inserts 74, preferably of polytetrafluoroethylene, which normally do not engage the track surfaces. However, these inserts do prevent damage to the track surfaces should they engage them.

Turning to FIG. 5 of the drawing, fragmentarily illustrated therein is a sampling valve 80 which is identical to the valve 10, except that only the passages 40, 42 and 48 are present. Thus, the sampling valve 80 is a simple on-off valve controlling flow of the sample stream.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim:

1. In a sampling valve, the combination of: a housing having two passages therein and including two spaced track surfaces separately disposed on two members of the housing; a valve element disposed between and having surfaces in sealing engagement with said track surfaces and provided with a passage therein, said valve element being movable along said track surfaces between a position wherein said passage in said valve element is out of communication with said passages in said housing and a position wherein said passage in said valve element is in communication with and interconnects said passages in said housing, said two housing members being loosely joined together to permit limited movement of one of the track surfaces relative to the other in the direction of movement of said valve element between said positions; and means maintaining said track surfaces in sealing engagement with said surfaces of said valve element, said means including means for applying a compression loading to said surfaces of the valve element disposed between the track surfaces of the two members.

2. In a sampling valve, the combination of: a housing having two passages therein and including two spaced track surfaces separately disposed on two members of the housing; a valve element disposed between and having surfaces in sealing engagement with said track surfaces and provided with a passage therein, said valve element being movable along said track surfaces between a position wherein said passage in said valve element is out of communication with said passages in said housing and a position wherein said passage in said valve element is in communication with and interconnects said passages in said housing, said two housing members being joined together to permit limited movement of one of said housing members and its associated track surfaces relative to the other housing member and its associated track surface in the direction of movement of said valve element between said positions, said valve element being composed of a non-metallic self lubricating material and possessing the characteristics of exhibiting only limited flow under clamping stresses and exhibiting chemical inertness to materials contacting it; and means maintaining said track surfaces in sealing engagement with said surfaces of said valve element, said means including means for applying a compression loading to the valve element disposed between the track surfaces of the two members.

3. In a sampling valve, the combination of: a housing having two passages therein and including two spaced track surfaces separately disposed on two members of the housing; a valve element disposed between and having surfaces in sealing engagement with said track surfaces and provided with a passage therein, said valve element being movable along said track surfaces between a position wherein said passage in said valve element is out of communication with said passages in said housing and a position wherein said passage in said valve element is in communication with and interconnects said passages in said housing, said two housing members being joined together to permit limited movement of one of said housing members and its associated track surfaces relative to the other housing member and its associated track surface in the direction of movement of said valve element between said positions, said valve element being formed of a material which is selected from the group consisting of polytetrafluoroethylene and fluorinated ethylene-propylene polymers and to which has been added a substance rendering said material subject to only limited deformation up to a given stress; and means maintaining said track surfaces in sealing engagement with said surfaces of said valve element, said means including means for applying a compression loading to the surfaces of the valve element disposed between the track surfaces of the two members.

4. In a sampling valve, the combination of: a housing having two passages therein and including two spaced track surfaces separately disposed on two members of the housing; a valve element disposed between and having surfaces in sealing engagement with said track surfaces and provided with a passage therein, said valve element being movable along said track surfaces between a position wherein said passage in said valve element is out of communication with said pasages in said housing and a position wherein said passage in said valve element is in communication with and interconnects said passages in said housing; and means maintaining said track surfaces in sealing engagement with said surfaces of said valve element, including pairs of bolt means and openings in said respective members of said housing for receiving said bolt means, said openings providing slight clearance between the side walls thereof and said bolt means to permit limited movement of one of said housing members and its associated track surface relative to the other housing member and its associated track surface in the direction of movement of said valve element between said positions, said bolt means maintaining a predetermined maximum spacing between said track surfaces, and including equalizing spring means interconnecting said bolt means of each pair, said equalizing spring means being disposed about the bolt means immediately adjoining the heads thereof.

References Cited in the file of this patent
UNITED STATES PATENTS

| | | |
|---|---|---|
| 2,757,541 | Watson et al. | Aug. 7, 1956 |
| 2,813,041 | Mitchell et al. | Nov. 12, 1957 |
| 2,830,738 | Sorg et al. | Apr. 15, 1958 |
| 2,846,121 | Ronnebeck | Aug. 5, 1958 |
| 2,945,831 | Evans et al. | July 19, 1960 |
| 2,972,888 | Lamkin | Feb. 28, 1961 |
| 3,056,709 | Rising | Oct. 2, 1962 |